United States Patent Office 3,707,585
Patented Dec. 26, 1972

3,707,585
SUSPENSION POLYMERIZATION OF VINYL MONOMERS
Takehiko Okamoto, Shirasawa, and Masakazu Inoue, Akihiko Kishimoto, and Tadahiro Sueyoshi, Nagoya, Japan, assignors to Toray Industries, Inc., Chuo-ku, Tokyo, Japan
No Drawing. Continuation-in-part of application Ser. No. 670,380, Sept. 25, 1967. This application May 6, 1970, Ser. No. 35,284
Claims priority, application Japan, Sept. 26, 1966, 41/62,981; Sept. 29, 1966, 41/63,907
Int. Cl. C08f 1/11
U.S. Cl. 260—883
4 Claims

ABSTRACT OF THE DISCLOSURE

A process for the suspension polymerization of vinyl monomers in an aqueous medium using as a suspending aid a copolymer of an acrylic acid ester with 70–90% acrylamide, which process provides high suspension stability, good control of particle size of the resultant polymer and a resultant polymer having an excellent transparency.

---

This application is a continuation-in-part of application Ser. No. 670,380 filed Sept. 25, 1967, now abandoned.

The instant invention is directed to a suspension polymerization process whereby vinyl monomers capable of radical polymerization are polymerized in an aqueous medium. In particular, the instant invention is directed to the suspension polymerization of vinyl monomers capable of radical polymerization, such as styrene and methyl methacrylate.

It is known that polymers having a pearly form may be obtained by polymerizing suitable monomers in suspension state in an aqueous medium. Exemplary of such monomers are styrene, methyl methacrylate, combinations thereof, or mixtures of such monomers with other monomers capable of copolymerization therewith. In such suspension polymerization systems, the stability of the monomer-polymer phase has in the past been stabilized by use of a suspending aid or suspensor such as inorganic colloidal material. Exemplary of such materials previously employed are barium sulfate, calcium carbonate, and calcium phosphate, or water soluble high polymeric materials such as polyvinyl alcohol and carboxymethyl cellulose and the like.

In such suspension polymerization techniques, if one is employing a monomer which is sparingly soluble in water, the process is conventionally carried out by stirring the monomer in water with the reaction proceeding as the monomers are being dispersed as small particles therein. In such instances, however, where the suspension stability of the dispersed monomer phase as small particles is not fully maintained, the thickness of the monomer phase increases as the polymerization progresses, with the result that agglomerates form and make further polymerization impossible. Therefore, complete suspension stability is required in suspension polymerization processes, especially during that period in which the thickness of the monomer phase is high.

Furthermore, since this first monomer phase is converted intact to the polymer phase, the formation of particles which are too small results in difficult recovery techniques, which have not already been adequate. That is to say, when the above-noted organic high polymeric materials, such as polyvinyl alcohol, carboxymethyl cellulose and the like, have been used as suspending aids, a primary disadvantage thereof has been the formation of small particles of a size smaller than 10 microns, which particles are commonly referred to as emulsion polymerized particles, result. As a consequence thereof, the ultimate yield of polymer from the suspension polymerization process is less than that which would be desired and further, as a result of the formation of such emulsion polymerized particles, there is a substantial decline in the transparency of the resultant product.

In those instances where one desires to produce a polymer which has a high degree of transparency, such as, for example, polystyrene, polymethyl methacrylate, styrene-acrylontrile copolymer and the like, the above-noted decline in transparency is a highly undesirable disadvantage.

When, as noted above, inorganic colloidal materials have been employed as the suspending aid or suspensor, such inorganic colloidal materials frequently became mixed with the polymer produced and result in an impure polymer yield. Furthermore, when such inorganic colloidal materials become intermixed with the resultant polymer, there is also a substantial decline in the transparency of the product.

There has, therefore, been a demand for a suspensor which does not affect the transparency of the ultimate product and further which enhances the stability of the suspension system. Furthermore, there has been a need for a suspensor which would facilitate the control of the particle size of the resulting polymer. It is noted, however, that the above-noted criterion for a suspensor have not been fully met by the foregoing conventional suspending aids, as noted above.

Therefore, it is an object of the instant invention to provide a suspensor which satisfies the above-noted requirements.

It has been found that the foregoing object of the instant invention may readily be achieved by employing as the suspensor an acrylic polymer consisting of 70–90% of acrylamide and at least one compound having the formula:

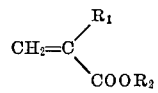

wherein $R_1$ represents hydrogen or methyl and $R_2$ is an alkyl group having from about 1 to about 4 carbon atoms, such as methyl, ethyl, propyl, isopropyl, butyl, isobutyl and the like.

According to the instant invention, when one employs the above-noted suspending aid, the stability of the particles in the monomer phase has been found to be exceedingly good during the polymerization reaction. Furthermore, it has been found that the following advantages are also obtained over the previously noted suspending aids: a pearly bead form of the polymer may be obtained without agglomeration of the particles occurring during the polymerization reaction, and more surprising, there is little, if any, formation of emulsion polymerized particles, which, as noted above, has been a major disadvantage of the previously known suspending aids, and previously thought to be inevitable in a suspension polymerization wherein an organic high polymeric suspending aid was employed. It has further been found that one can by employing the above-noted suspending aid control the size of the polymer particles produced, which size has been found to vary as a function of the quantity of suspending aid employed.

According to the instant invention, vinyl monomers such as styrene or methyl methacrylate, either alone or in combination with other vinyl monomers copolymerizable therewith, are dissolved in prescribed amounts of a radical generating initiator, such as, for example, benzoyl peroxide, lauroyl peroxide, azobisisobutyronitrile and the like, and a chain transfer agent, such as a mercaptan and the like, which are soluble in the aforesaid monomers. The solution is then rendered homogeneous by thorough stirring thereof.

The suspending aid or suspensor is then prepared by dissolving an acrylic polymer containing 70–90% acrylamide and at least one compound of the formula:

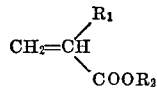

wherein $R_1$ represents hydrogen or methyl and $R_2$ represents an alkyl group having from 1 to 4 carbon atoms, as defined above, in an aqueous medium and charged into a reactor. The amount of suspensor employed may be readily determined by the class of monomers to be polymerized and the ultimate particle size desired. In general, however, one employs from about 1.0 to 0.01 part by weight per 100 parts by weight of total monomers. Furthermore, if desired, one may employ inorganic salts, such as sodium sulfate, sodium chloride, sodium phosphate and the like to adjust the pH of the polymerization system. The temperature of said system is then adjusted to the prescribed temperature while stirring the aqueous medium. When the temperature is reached, the reaction is then charged with the above-described monomeric mixture, subsequent to which the vapor phase is purged with nitrogen gas and the temperature controlled until the conversion of monomer to polymer is completed. As a result of the instant process, a polymer having a perfect pearly form is obtained, which polymer is dehydrated, washed with an acidic, neutral or alkaline medium, if required, and then recovered.

In this connection, it is noted that a further advantage of the instant invention is that the acrylic polymer suspensor thereof functions effectively over a wide range of pH, both acid and alkaline. As a result thereof, said suspensor is particularly well suited with certain classes of vinyl monomers which are sensitive to the pH of the aqueous medium employed in suspension polymerization processes. More specifically, in the polymerization of methyl methacrylate or in copolymerizing styrene and acrylonitrile, hydrolysis of the methyl methacrylate and acrylonitrile may occur if the pH of the aqueous phase of the polymerization system is too high. As a result of such hydrolysis, there is a direct decline in the quality of the ultimate polymer produced. Therefore, as noted, the suspensor of the instant invention has a further advantage inasmuch as it functions effectively over a broad range of pH conditions.

It is further noted that the suspending aid of the instant invention may readily be dissolved and removed subsequent to completion of suspension polymerization, if necessary, by merely washing the polymeric particles with a neutral, acidic or alkaline medium. As a result thereof, the impurities which might be contained in the ultimate product and which have an adverse effect thereon may be easily reduced or totally removed.

As noted, the suspensor of the instant invention comprises an acrylic polymer containing 70–90% acrylamide. Such acrylamide copolymers may be readily prepared by dissolving acrylamide or a mixture of acrylamide and at least one acrylic acid ester having the formula:

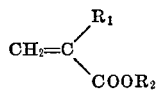

wherein $R_1$ and $R_2$ are as defined above, in a suitable solvent such as, for example, water, a mixture of water and alcohol, a mixture of water, acetone and alcohol and/or benzene, and the like, subsequent to which the polymerization reaction is carried out by employing a suitable radical generating initiator such as persulfate, azobisisobutyronitrile, and the like.

In connection with the suspending agents of the instant invention, which as noted above comprise a copolymer of 70–90% of acrylamide and acrylic acid ester, it is noted that those copolymers consisting of 80% by weight of acrylamide and 20% by weight of methyl methacrylate are preferred, inasmuch as said copolymers provide improved transparency in connection with the resultant polymer which is polymerized by the suspension technique. It is also noted that when the acrylamide content of said copolymer is about 75%, the reaction mixture obtained by polymerizing said acrylamide monomer with an acrylic acid ester in water is conveniently used as obtained as the suspending aid. When, however, the acrylamide content of the subject copolymer is below 75%, it is convenient to use a water-isopropyl alcohol mixture as the solvent therefor. In this connection, it is noted that the particular method by which said acrylamide copolymer is produced is not critical to the instant invention, and further that the exact method of preparation thereof does not impose any limitation whatsoever on the effects of the suspending aid.

During the preparation of the suspending aid of the instant invention, intramolecular cyclization and cross-linking, which are believed to be chiefly due to the formation of imide-linkages, may occur depending upon the polymerization conditions. As a result of said intramolecular cyclization and cross-linking, the aqueous solution of the suspensor may become partly cloudy at times. In this connection, it is noted that this condition is not objectionable, and if necessary, the cloudiness may be removed by the use of a procedure such as hydrolysis whereby the imide-linkages are broken. An improvement in the suspendnig aid may on occasion be effected by such a treatment.

In connection with the process of the instant invention, it has also been found that if one employs a nonionic surfactant in an amount not exceeding one-third by weight of the total amount of the suspending aid, one can provide a still further improvement in the results obtained. The conjoint use of the nonionic surfactant has the effect of enhancing the suspension stability still further and further reducing the amount of suspending aid employed. It has also been noted that the use of such a nonionic surfactant has a further effect in making more uniform the particle diameter of the polymeric beads which are obtained as the result of the process. In this connection, it is noted that if the amount of nonionic surfactant exceeds one-third by weight of the total amount of the acrylic polymer suspending aid, there is a tendency toward the formation of emulsion polymerized particles in the system, and therefore the use of more than one-third by weight is considered undesirable. On the other hand, if one employs an anionic or a cationic surfactant in lieu of the nonionic surfactant, as noted above, the improvement in the suspension polymerization process is not obtained and further there is an increase in the formation of emulsion polymerized particles. That is to say, the use of anionic and cationic surfactants in lieu of the nonionic surfactant, as disclosed above, is not desirable in connection with the process of the instant invention. Therefore, one must use only a nonionic surfactant in connection therewith in the amounts noted above. Furthermore, inasmuch as suspension polymerization is conventionally carried out at an elevated temperature of about 50° C., the nonionic surfactant employed should preferably be one which is soluble in hot water. The particular type of nonionic surfactant employed is not critical hereto, but as noted above, preferably it is soluble in hot water. Exemplary of the useful nonionic surfactants are polyoxyethylene phenol ether, polyoxyethylene alkyl esters, polyoxyethylene alkyamides, and the like.

The monomers which are polymerized according to the process of the instant invention are vinyl monomers which are relatively insoluble in water and which are capable of radical polymerization. Included are, for example, the aromatic vinyl monomers such as styrene, alkyl esters of acrylic acid such as methyl methacrylate, methyl acrylate, ethyl acrylate, butyl acrylate, and the like, mixtures of the foregoing monomers such as styrene-acrylonitrile, styrene-methyl methacrylate, styrene-methyl methacrylate and acrylonitrile, mixtures of the foregoing with monomers which are also water insoluble and copolymerizable with said vinyl monomers, and the like. It is also noted that divinyl monomers which are copolymerizable in connection with the above compounds may also be employed in connection with the process of the instant invention. Furthermore, a liquid mixture of vinyl monomers in which mineral oil or a rubbery elastomer such as polybutadiene or a butadiene-styrene copolymer are dissolved, may also be employed.

In connection with the process of the instant invention, one may employ a radical generating initiator which is oil soluble. Such initiators include those conventionally employed in suspension polymerization techniques and include, for example, organic peroxides such as benzoyl peroxide, lauroyl peroxide, di-t-butyl-peroxide and the like, or organic hydroperoxides, and the like, or azo compounds such as azobisisobutyronitrile, and the like. It is noted that there is no restriction with regard to the particular radical generating initiator employed in connection with the instant process.

Normally, the monomer to water ratio employed in connection with a suspension polymerization of the instant process is within the range of 1:1 to 1:3 on a weight basis, and the amount of the suspensor charged into the reactor is suitably 0.01–1.0 part by weight per 100 parts by weight of said monomer. These amounts may be suitably increased or decreased in accordance with the desired particle size requirements of the resultant polymer.

The pH of the polymerization system may, as noted above, range from acid to alkaline. It is noted, however, that preefrably one employs a pH of from about 4 to about 9, wherein outstanding effects, particularly with regard to the transparency of the polymer, the particle size and the like, are obtained.

The polymerization temperature employed in connection with the process of the instant invention is that temperature suitable to the class of monomers to be polymerized and the class of initiators employed. That is to say, the temperature is not critical to the use of the instant suspending aids. For example, when 70 parts of styrene and 30 parts of acrylonitrile are to be polymerized, employing azobisisobutyronitrile as the initiator, the temperature is conventionally raised from about 65° to 120° C. in about 5 hours, and subsequently maintained at 120° C. for one hour to complete the polymerization reaction.

The instant invention will now be illustrated by the following more detailed examples thereof. It is to be noted, however, that the instant invention is not deemed as being limited thereto.

EXAMPLE 1

A reactor was charged with 80 parts of acrylamide, 20 parts of methyl methacrylate, 0.3 part of potassium persulfate and 1500 parts of ion-exchanged water. After the atmosphere of the reactor was replaced by nitrogen gas, the reaction was carried out with stirring at a temperature maintained at 70° C. until the monomers were completely converted into a polymer. As a result, there was obtained an aqueous solution of the copolymer of acrylamide with methyl methacrylate, which was a slightly clouded, transparent, viscous liquid. A 3% dilution thereof was prepared and was used as a suspensor.

EXAMPLE 2

A reactor was charged with 80 parts of acrylamide, 20 parts of methyl acrylate, 0.3 part of potassium persulfate and 1500 parts of ion-exchanged water. The atmosphere of the reactor was replaced by nitrogen gas and the temperature was maintained at 70° C. The reaction was continued until the monomers were completely converted into a polymer. As a result, there was obtained an aqueous solution of a copolymer of acrylamide with methyl acrylate. The so obtained solution was a slightly clouded, transparent, viscous liquid, from which was prepared a 3% dilution, and it was used as a suspensor.

EXAMPLE 3

Eighty parts of acrylamide, 20 parts of ethyl methacrylate, 750 parts of ion-exchanged water, 250 parts of isopropyl alcohol and 0.2 part of potassium persulfate were uniformly mixed. The reaction was carried out in a sealed reactor at 60° C. under a nitrogen atomsphere for 5 hours. As a result, there was obtained a slightly white-muddy aqueous solution. The isopropyl alcohol was removed while maintaining the temperature at 82–85° C., whereby there was obtained an aqueous solution of acrylamide/ethyl methacrylate copolymer. A 3% dilution of said solution was prepared, and it was used as a suspensor.

EXAMPLE 4

Using the 20/80 copolymer of methyl methacrylate/acrylamide obtained in Example 1 as a suspensor, the polymerization of methyl methacrylate was carried out according to the following recipe.

Recipe

| Substance: | Parts |
|---|---|
| Methyl methacrylate | 100 |
| t-Dodecylmercaptane | 0.1 |
| Azobisisobutyronitrile | 0.3 |
| Methyl methacrylate/acrylamide copolymer | 0.05 |
| Disodium hydrogen phosphate | 1.0 |
| Sodium dihydrogen phosphate | 0.5 |
| Ion-exchanged water | 200 |

The polymerization was carried out in the same manner as in Example 2. As a result, there were obtained beads having an average size of 60–80 mesh, which were quite excellent in transparency. No formation of emulsion polymerized particles was observed.

The so obtained polymethyl methacrylate had a flow characteristic suitable for injection molding, and a molded article therefrom was also very excellent in transparency, having a haze value of 5.

EXAMPLE 5

The copolymerization of styrene with acrylonitrile was carried out by using the 20/80 copolymer of methyl methacrylate/acrylamide prepared in Example 1. The recipe adapted in the polymerization was as follows:

Recipe

| Substance: | Parts |
|---|---|
| Styrene | 75 |
| Acrylonitrile | 25 |
| t-Dodecylmercaptane | 0.2 |
| Lauroyl peroxide | 0.5 |
| Methyl methacrylate/acrylamide copolymer | 0.1 |
| Sodium sulfate | 1.5 |
| Ion-exchanged water | 200 |

The polymerization was carried out in the same manner as in Example 4. After the polymerization, the obtained polymer was filtered, washed with alkaline water and demineralized water, and dehydrated. As a result, the polymer was obtained as brilliant beads having an average size of 80 mesh. No formation of an agglomerated mass or muddy emulsion polymerized particles was observed. The haze value of the obtained resin was 6.

EXAMPLE 6

The copolymerization of three components, i.e., styrene, acrylonitrile and methyl methacrylate was carried out by using the 20/80 copolymer of methyl methacrylate/acrylamide prepared in Example 1. The recipe adopted in the polymerization was as follows:

Recipe

| Substance: | Parts |
|---|---|
| Styrene | 40 |
| Methyl methacrylate | 50 |
| Acrylonitrile | 10 |
| t-Dodecylmercaptane | 0.1 |
| Azobisisobutyronitrile | 0.3 |
| Methyl methacrylate/acrylamide copolymer | 0.03 |
| Disodium hydrogen phosphate | 1.0 |
| Sodium dihydrogen phosphate | 0.5 |
| Ion-exchanged water | 200 |

The polymerization was carried out in the same manner as in Example 4. As a result, the polymer was obtained in a form of colorless, transparent beads having an average size of 60 mesh. No formation of an agglomerated mass or muddy emulsion polymerized particles was observed.

EXAMPLE 7

Eight parts of polybutadiene free of gel were dissolved into 67 parts of styrene and 25 parts of acrylonitrile. After 0.2 part of benzoylperoxide was added to the solution, it was charged into a reactor. The polymerization was carried out under nitrogen gas stream until the polymer conversion reached 20%. The so obtained prepolymer was subjected to suspension polymerization according to the following recipe:

Recipe

| Substance: | Parts |
|---|---|
| Prepolymer solution | 100 |
| t-Dodecylmercaptane | 0.2 |
| Lauroyl peroxide | 0.4 |
| 20/80 copolymer of methyl methacrylate/acrylamide | 0.15 |
| Sodium sulfate | 1.5 |
| Dimineralized water | 200 |

The polymerization was carried out in the same manner as in Example 4 and it proceeded very stably. No formation of an agglomerated mass was observed. The so obtained final polymer was in a form of white beads having an average size of 12–20 mesh. After the polymer beads were filtered, they were so beautiful as to be capable of being molded as they were.

EXAMPLE 8

Seventy-five parts of styrene were mixed with 25 parts of acrylonitrile. To said mixture, 0.3 part of azobisisobutyronitrile and 0.1 part of t-dodecylmercaptane were dissolved and they were mixed uniformly.

Separately, a sealable, pressure-resistant glass reactor was charged with 200 parts of an ion-exchanged water and the aqueous solution of the acrylamide/methyl acrylate copolymer obtained in Example 2 in such an amount that 0.2 part of said copolymer was contained therein. After 1.5 parts of sodium chloride were added and dissolved, the pH of the solution was adjusted at 4–7. Thereafter, air in the reactor was replaced by nitrogen gas and the temperature in the reactor was raised with suitable stirring. When the temperature in the reactor was raised step by step to 120° C. over a period of 5 hours, at which temperature it was maintained for 1 hour with stirring. After the reaction system was cooled to 70° C., the reaction product was taken out. As a result, there was obtained a colorless, transparent polymer in the form of beautiful beads having an average size of 0.5 mm.

About 0.3% of emulsion polymerized particles was formed in the polymerization system, and the polymer yield was 97%. By filtering and drying the beads, there was obtained a polymer very suitable for molding and the molded article therefrom was exceedingly excellent in transparency, having a haze value of 6.

EXAMPLE 9

The polymerization of methyl methacrylate was carried out according to the following recipe by using the 80/20 copolymer of acrylamide/methyl acrylate prepared in Example 2 as a suspensor:

Recipe

| Substance: | Parts |
|---|---|
| Methyl methacrylate | 100 |
| t-Dodecylmercaptane | 0.1 |
| Azobisisobutyronitrile | 0.3 |
| Acrylamide/methyl acrylate copolymer | 0.05 |
| Disodium hydrogen phosphate | 1.0 |
| Ion-exchanged water | 200 |

The polymerization was carried out in the same manner as in Example 8. As a result of the polymerization, there were obtained beads having an average size of 60–40 mesh and being excellent in transparency. About 0.2% of emulsion polymerized particles was formed in the polymerization system.

The so obtained polymethyl methacrylate has a flow characteristic suitable for injection molding and the molded article therefrom was excellent in transparency, having a haze value of 6.

EXAMPLE 10

The copolymerization of three monomers, i.e., styrene, acrylonitrile and methyl methacrylate, was carried out by using the 80/20 copolymer of acrylamide/methyl acrylate prepared in Example 2 as a suspensor. The recipe used was as follows:

Recipe

| Substance: | Parts |
|---|---|
| Styrene | 40 |
| Acrylonitrile | 10 |
| Methyl methacrylate | 50 |
| t-Dodecylmercaptane | 0.1 |
| Azobisisobutylronitrile | 0.3 |
| Acrylamide/methyl acrylate copolymer | 0.03 |
| Disodium hydrogen phosphate | 1.0 |
| Sodium dihydrogen phosphate | 0.5 |
| Ion-exchanged water | 300 |

The polymerization was carried out in the same manner as in Examples 8–9. The so obtained polymer took a form of colorless, transparent beads having an average size of 60 mesh. There was hardly observed any formation of emulsion polymerized particles or an agglomerated mass in the polymerization system.

EXAMPLE 11

Eight parts of polybutadiene free of gel were dissolved in 67 parts of styrene and 25 parts of acrylonitrile, and 0.3 part of benzoyl peroxide was added thereto. After the mixture was charged into a reactor, the polymerization was carried out under nitrogen gas stream until the polymer conversion reached about 15%. Next, the thus prepared prepolymer was subjected to suspension polymerization according to the following recipe:

Recipe

| Substance: | Parts |
|---|---|
| Prepolymer solution | 100 |
| t-Dodecylmercaptane | 0.2 |
| Lauroyl peroxide | 0.4 |
| 80/20 copolymer of acrylamide/methyl acrylate | 0.15 |
| Sodium chloride | 1.5 |
| Ion-exchanged water | 200 |

The polymerization was carried out in the same manner as in Examples 8–10, and it proceeded very stably. The final polymer was obtained as white beads having an average size of 10–20 mesh.

The polymer beads were filtered and washed with water. Thus, they were so beautiful as to be capable of being molded as they were.

EXAMPLE 12

The copolymerization of styrene with acrylonitrile was carried out by employing an aqueous solution of the 80/20 copolymer of acrylamide and ethyl methacrylate prepared in Example 3. The following recipe was adopted in the polymerization:

Recipe

| Substance: | Parts |
|---|---|
| Styrene | 76 |
| Acrylonitrile | 24 |
| t-Dodecylmercaptane | 0.2 |
| Azobisisobutyronitrile | 0.4 |
| Acrylamide/ethyl methacrylate copolymer (pure) portion | 0.1 |
| Sodium dihydrogen phosphate | 1.0 |
| Disodium hydrogen phosphate | 0.5 |
| Ion-exchanged water | 250 |

The polymerization was carried out in the following procedure.

At first, ion-exchanged water was charged into a sealable, pressure-resistant glass reactor. Then sodium dihydrogen phosphate, disodium hydrogen phosphate and acrylamide/ethyl methacrylate copolymer were dissolved thereinto in order. The atmosphere of the reaction system was fully replaced by an inert gas such as nitrogen. The temperature was raised step by step with a suitable stirring, and when the temperature of the reaction system reached 60° C., said monomeric mixture in which an initiator and a chain transfer agent had been dissolved was added to the reaction system. Thereafter, the reactor was sealed. The temperature in the reaction system was raised to 110° C. over a period of 5 hours, at this point for 7.5 hours with stirring. After the reaction system was cooled to 70° C., the obtained pearly product was taken out, filtered, washed, dehydrated and then dried. As a result, there was obtained a styrene acrylonitrile copolymer in the form of colorless, transparent, brilliant beads having an average size of 42–60 mesh.

No formation of emulsion polymerized particles was observed, and the polymer yield was 97.5%.

A sheet of a thickness of 1 mm. prepared by compression-molding of the so obtained polymer was excellent in transparency.

EXAMPLE 13

Seventy-five parts of acrylamide, 15 parts of methyl methacrylate and 10 parts of methyl acrylate were dissolved in 1000 parts of ion-exchanged water. To this mixture, 0.2 part of potassium persulfate was added. The polymerization of said mixture was carried out at a temperature of 55° C. for 6 hours. The so obtained solution was used as a suspensor for the copolymerization of styrene with methyl methacrylate. The recipe was as follows:

Recipe

| Substance: | Parts |
|---|---|
| Styrene | 50 |
| Methyl methacrylate | 50 |
| t-Dodecylmercaptane | 0.3 |
| Azobisisobutyronitrile | 0.4 |
| Suspensor (pure portion) | 0.05 |
| Sodium dihydrogen phosphate | 0.5 |
| Ion-exchanged water | 200 |

The polymerization was carried out in the following procedure.

A sealable, glass reactor was charged with ion-exchanged water. Next, sodium dihydrogen phosphate and the suspensor were dissolved thereinto in order with stirring. The atmosphere of the reactor was fully replaced by nitrogen gas. When the temperature was raised to a reaction temperature with stirring, a mixture of monomers, azobisisobutyronitrile and mercaptan were charged into the reactor. Then it was sealed. The polymerization reaction was carried out at 80° C. for one hour. The temperature was raised to 120° C. over a period of one hour, and maintained at this point for one hour. The polymerization proceeded with a good suspension stability. As a result, there was obtained polymeric beads having a uniform distribution of particle size and an average size of 0.3 mm. The so obtained polymer was pelletized and injection-molded. The so molded article was excellent in transparency.

EXAMPLE 14

The polymerization of styrene was carried out according to the following recipe by using as a suspensor a mixture consisting of 50 parts of the 80/20 copolymer of acrylamide/methyl methacrylate prepared in Example 1 and 50 parts of the 80/20 copolymer of acrylamide/methyl acrylate prepared in Example 2:

Recipe

| Substance: | Parts |
|---|---|
| Styrene | 100 |
| t-Dodecylmercaptane | 0.3 |
| Azobisisobutyronitrile | 0.3 |
| Azobiscyclohexanenitrile | 0.1 |
| Suspensor | 0.05 |
| Sodium dihydrogen phosphate | 0.5 |
| Ion-exchanged water | 200 |

The polymerization was carried out in almost the same way as in the other examples. The reaction was carried out for 2.5 hours at 80° C. The temperature was raised to 110° C. over a period of one hour, and maintained at this point for one hour.

The suspension stability was very excellent in the polymerization, and any agglomeration or attachment to the reactor, of particles was hardly observed. The obtained polymeric beads were beautiful and had an average size of 0.4 mm. The polymer was excellent in mold ability and transparency.

EXAMPLE 15

The suspension polymerization of styrene and acrylonitrile was carried out by using the methyl methacrylate/acrylamide copolymer prepared in Example 1. The recipe was as follows, and the polymerization was carried out in a sealed reactor, the atmosphere of which had been replaced by nitrogen gas, with suitable stirring at 80° C. for 3 hours and at 110° C. for an additional 2 hours. Then the polymerization was completed.

Recipe

| Substance: | Parts |
|---|---|
| Styrene | 70 |
| Acrylonitrile | 30 |
| n-Dodecylmercaptane | 0.2 |
| Azobisisobutyronitrile | 0.3 |
| Methyl methacrylate/acrylamide copolymer [1] | 0.03 |
| Nonionic surfactant [2] | 0.005 |
| Sodium sulfate | 0.5 |
| Sodium dihydrogen phosphate | 0.5 |
| Ion-exchanged water | 200 |

[1] Part of pure portion; methyl methacrylate/acrylamide=20/80.
[2] Polyoxyethylene phenol ether.

As a result, there was obtained a polymer in the form of colorless, transparent, pearly beads which were so uniform that more than 92% of them had a particle size of 60–80 mesh. The suspension stability was very excellent in the monomer polymer phase during the polymerization, and the polymerization proceeded very stably. There was not observed any formation of an agglomerated mass in the polymerization system.

EXAMPLE 16

The three-component copolymer was prepared by suspension polymerizing methyl methacrylate, styrene and acrylonitrile using the methyl methacrylate/acrylamide copolymer obtained in Example 1 as a suspensor.

The charging and polymerization were carried out as in Example 1. The recipe was as follows:

Recipe

| Substance: | Parts |
|---|---|
| Styrene | 40 |
| Methyl methacrylate | 50 |
| Acrylonitrile | 10 |
| n-Dodecylmercaptane | 0.2 |
| Azobisisobutyronitrile | 0.4 |
| 20/80 copolymer of methyl methacrylate/acrylamide [1] | 0.02 |
| Nonionic surfactant [2] | 0.005 |
| Sodium dihydrogen phosphate | 0.05 |
| Ion-exchanged water | 200 |

[1] Part of pure portion.
[2] Polyoxyethylene alkylamide.

The polymerization proceded very stably. More than 90% of the so obtained beads had a particle size of 60–80 mesh, and they were transparent, pearly beads. There was hardly observed any formation of emulsion polymerized parts or an agglomerated mass.

EXAMPLE 17

A mixture consisting of 75% of acrylamide, 15% of methyl methacrylate and 10% of methyl acrylate was polymerized by using potassium persulfate as an initiator. By using as a suspensor an aqueous solution of the so prepared three-component copolymer and as a suspension stabilizing assistant a nonionic surface active agent (polyoxyethylene phenol ether), the copolymerization of styrene with acrylonitrile was carried out according to the following recipe:

Recipe

| Substance: | Parts |
|---|---|
| Styrene | 75 |
| Acrylonitrile | 25 |
| t-Dodecylmercaptane | 0.3 |
| Azobisisobutyronitrile | 0.4 |
| Acrylamide/methyl methacrylate/methyl acrylate copolymer | 0.05 |
| Nonionic activator | 0.01 |
| Sodium dihydrogen phosphate | 0.5 |
| Ion-exchanged water | 200 |

The polymerization was carried out in the same way as in the other examples. The reaction was carried out at 80° C. for 1.5 hours. The temperature was raised to 110° C. over a period of 0.5 hour, and maintained at this point for one hour. The suspension stability of beads was very excellent in the polymerization, and any agglomeration or attachment to the reactor, of particles was hardly observed. Further, emulsion polymerized particles were hardly formed. The obtained beads were beautiful and had an average size of 0.3 mm. A molded article prepared from said beads was excellent in transparency.

EXAMPLE 18

The polymerization was carried out according to the following recipe by using as a suspensor a mixture consisting of 60 parts of the 80/20 copolymer of acrylamide/methyl methacrylate and 40 parts of the 80/20 copolymer of acrylamide/methyl acrylate and as a suspension stabilizing assistant a nonionic surfactant (polyoxyethylene alkyl ester).

Recipe

| Substance: | Parts |
|---|---|
| Styrene | 97 |
| Divinyl benzene | 3.0 |
| Fluid paraffin | 2.0 |
| Benzoyl peroxide | 0.4 |
| Suspensor | 0.06 |
| Nonionic surfactant | 0.01 |
| Sodium dihydrogen phosphate | 0.5 |
| Ion-exchanged water | 200 |

The polymerization was carried out in a sealed reactor under a nitrogen atmosphere as in the other examples. The reaction was carried out at 90° C. for 2 hours. The temperature was raised to 110° C. over a period of 0.5 hour, and maintained at this point for 1.5 hours.

The so obtained polymer had a very narrow particle distribution (average size of 0.5 mm.) and was very beautiful. No agglomeration or attachment to the reactor, of particles was observed. This shows that the polymerization proceeded very stably.

CONTROL 1

As heretofore disclosed, when the surfactant conjointly used in the present invention is a nonionic surfactant, it exhibits an excellent effect.

As a control, the polymerization was carried out by employing the same recipe as in Example 15 except that sodium oleate, an anionic surfactant, was used instead of the nonionic surfactant. As a result, it was observed that suspension stability in the monomer-polymer phase during the polymerization was worse than in the absence of a surfactant, and the so obtained polymer was randomly agglomerated and more than 20% thereof had a size of more than 10 mesh. Further, considerable emulsion polymerized particles were yielded. From this control also, it is evident that a nonionic surfactant exhibits an excellent effect as compared with an anionic surfactant.

CONTROL 2

The copolymerization of styrene with acrylonitrile was carried out by using as a suspensor carboxymethyl cellulose in various amounts. The recipe adopted was as follows:

Recipe

| Substance: | Parts |
|---|---|
| Styrene | 75 |
| Acrylonitrile | 25 |
| t-Dodecylmercaptane | 0.3 |
| Azobisisobutyronitrile | 0.3 |
| Ion-exchanged water | 200 |
| Carboxymethyl cellulose | 1.0, 0.5 and 0.05 |

The polymerization was carried out at 80° C. for 1.5 hours with adequate stirring under a nitrogen atmosphere. The temperature was raised to 110° C. over a period of 0.5 hour, and maintained at this point for one hour. The results were as follows:

(i) In the case of carboxymethyl cellulose in an amount of 1.0 part:
   More than 30% of emulsion polymerized particles were formed 0.5 hour after the beginning of the polymerization; therefore, it was impossible to carry out the suspension polymerization.

(ii) In the case of using carboxymethyl cellulose in an amount of 0.5 part:
   The emulsion polymerized particles occupied 12% of the product. After the polymerization, the obtained polymer was filtered, washed with alkaline water and demineralized water and dehydrated. Then it was molded into a sheet having a thickness of 1 mm. The so prepared sheet was inferior in transparency and had a haze value of 13%.

(iii) In the case of using carboxymethyl cellulose in an amount of 0.05 part:

The polymerization system became solid one hour after the beginning of polymerization. It was impossible to continue the polymerization.

CONTROL 3

The copolymerization of styrene with acrylonitrile was carried out by employing polyvinyl alcohol as a suspensor. The recipe adopted in the polymerization was as follows:

Recipe

| Substance: | Parts |
|---|---|
| Styrene | 76 |
| Acrylonitrile | 24 |
| t-Dodecylmercaptane | 0.2 |
| Azobisisobutyronitrile | 0.35 |
| Polyvinyl alcohol | 0.5 |
| Ion-exchanged water | 200 |

The polymerization was carried out at a temperature of 75° C. with adequate stirring under a nitrogen atmosphere. One hour after the beginning of the polymerization, emulsion polymerized particles began to form, and the polymerization system became solid for 1.5 hours; therefore, it was impossible to continue the polymerization.

CONTROL 4

The polymerization of methyl methacrylate was carried out by employing carboxymethyl cellulose as a suspensor. The recipe adopted in the polymerization was as follows:

Recipe

| Substance: | Parts |
|---|---|
| Methyl methacrylate | 97 |
| Methyl acrylate | 3 |
| t-Dodecylmercaptane | 0.2 |
| Azobisisobutyronitrile | 0.4 |
| Carboxymethyl cellulose | 1.0 |
| Ion-exchanged water | 200 |

The polymerization was carried out with adequate stirring under a nitrogen atmosphere at 80° C. for 0.5 hour, said temperature being raised to 110° C. over a period of 2 hours.

It was 0.5 hour after the beginning of the polymerization that emulsion polymerized particles began to form. The whole polymerization system became solid 1.5 hours after the beginning of the polymerization. Therefore, it was impossible to continue the polymerization.

EXAMPLE 19

The following suspension polymerization reactions were carried out using specific polymerization conditions, specific monomers and a specific suspensor, while varying the amounts of the mercaptan and phosphate added to the polymerization system to demonstrate the lack of effect thereof on the process of this invention:

(i) Charge composition

| Substance: | Parts |
|---|---|
| Styrene | 76 |
| Acrylonitrile | 24 |
| t-Dodecylmercaptane | Variable |
| Azobisisobutyronitrile | 0.4 |
| Methyl methacrylate/acrylamide copolymer [1] | 0.035 |
| Sodium dihydrogenphosphate | Variable |
| Demineralized water | 150 |

[1] The MMa acrylamide ratio of the suspensor is 20/80 (parts by weight).

(ii) Polymerization method

The demineralized water was charged in a 15 l. stainless steel reactor provided with a stirrer, the air inside the reactor was replaced by $N_2$ gas, a prearranged aqueous solution of the suspensor and a prearranged aqueous solution of sodium dihydrogenphosphate were added thereto, the solution obtained by dissolving the catalyst and the mercaptan in the monomers were further added thereto under stirring, and the temperature was raised to commence polymerization. After polymerization was carried out at 75° C. for 2.5 hours, the temperature was raised to 105° C. in 0.5 hour, and the polymerization was carried out at 105° C. for one hour. The product was then dehydrated and dried, and polymer beads were obtained.

The polymer beads thus obtained had a particule diameter of 0.5–1 mm. and had very superior transparency. The transparency, the amount of the emulsion polymerized particles, etc. of the polymer obtained were measured. The results thus obtained are shown in Table 1 with reference to the amounts of mercaptan and phosphate in the polymerization system.

TABLE 1.—EFFECTS OF ADDITION OF MERCAPTAN AND PHOSPHATE

| Run No. | t-Dodecyl-mercaptane (parts) | Sodium dihydrogen phosphate (parts) | Haze value | Emulsion polymerized particles (percent) | Adhesion to polymerization vessel walls (percent) |
|---|---|---|---|---|---|
| 1 | 0.1 | 0.5 | 4.5 | 0.5 | 3.0 |
| 2 | 0.3 | 0.5 | 4.0 | 0.3 | 2.5 |
| 3 | 0.5 | 0.5 | 4.5 | 0.5 | 3.1 |
| 4 | 0.3 | 0.1 | 5.0 | 0.6 | 2.8 |
| 5 | 0.3 | 1.0 | 4.5 | 0.5 | 2.7 |
| 6 | 0.3 | 2.5 | 5.0 | 0.4 | 3.0 |

As is evident from the results of Table 1, the amounts of mercaptan and phosphate added to the polymerization do not exert any influence on the suspension polymerization stability or on the quality of the polymer formed.

EXAMPLE 20

Suspension polymerization reactions were carried out under the following polymerization conditions, varying only the kind of vinyl monomer to be polymerized.

(i) Charge composition

| Substance: | Parts |
|---|---|
| Vinyl monomer | 100 |
| t-dodecylmercaptane | 0.2 |
| Azobisisobutyronitrile | 0.4 |
| Methyl methacrylate/acrylamide copolymer [1] | 0.05 |
| Sodium dihydrogenphosphate | 0.5 |
| Demineralized water | 150 |

[1] The MMa/acrylamide ratio of the suspensor was 20/80 (parts by weight).

The procedure of Example 19 was repeated with polymerization being carried out at 70° C. for 4.5 hours, the temperature was then raised to 105° C. in 0.5 hour, and said temperature was maintained for 1 hour.

The polymerization was carried out stably in each case, and the polymer beads thus obtained had a particle diameter of 0.5–1 mm. and were very beautiful. The results thus obtained are shown in Table 2.

TABLE 2

| Monomers | ST | MMA | ST/MMA | BA/MMA | ST/AN | ST/MMA/AN |
|---|---|---|---|---|---|---|
| Suspension stability | Good | Good | Good | Good | Good | Good |
| Adhesion to walls (percent) | 1.5 | 1.0 | 1.5 | 1.0 | 2.5 | 3.0 |
| Emulsion polymerized particles (percent) | 0.1 | 0.2 | 0.2 | 0.1 | 0.3 | 0.2 |
| Haze value of polymer | 5 | 3 | 4 | 4 | 5.5 | 4 |

NOTE.—ST=Styrene; MMA=Methyl methacrylate; BA=Butyl acrylate; AN=Acrylonitrile; ST/MMA=70/30; BA/MMA=60/40; ST/AN=76/24; ST/MMA/AN/20/75/5.

EXAMPLE 21

For comparative purposes so as to clearly demonstrate the benefits of the instant invention which are obtained by using a copolymer of acrylamide containing 70–90% acrylamide monomer, the following comparative examples were prepared. A homopolymer of acrylamide was prepared by charging a reactor with 100 parts of acrylamide, 0.3 part of potassium persulfate and 1200 parts of ion-exchanged water. The atmosphere of the reactor was then replaced with nitrogen gas and the temperature thereof was raised to 70° C. for 6 hours. A copolymer comprising 90 parts of acrylamide and 10 parts of methyl methacrylate was prepared according to Example 1, and a copolymer comprising 90 parts of acrylamide and 10 parts of methyl acrylate was prepared according to Example 2. A copolymer comprising 70 parts of acrylamide and 30 parts of methyl methacrylate was prepared by dissolving said monomers with stirring into a mixture of 600 parts of ion-exchanged water, and 600 parts of isopropyl alcohol. 0.5 part of azobisisobutyronitrile was then dissolved in the solution and the solution was charged into a reactor, the atmosphere of which had been replaced by nitrogen gas. The temperature of the reactor was raised with stirring to 70° C. and maintained thereat for a period of 5 hours. The isopropyl alcohol was then removed by distillation while maintaining the temperature at 82–85° C. An aqueous solution of caustic soda was added to the resultant aqueous solution to obtain 3% aqueous solution which was maintained alkaline with stirring at room temperature until it became transparent.

A suspension copolymerization of styrene and acrylonitrile was then carried out employing each of the above suspending aids with the homopolymer amide being designated as suspensor A, the copolymer of 90 parts of acrylamide and 10 parts methyl methacrylate being designated suspensor B, the copolymer of 90 parts of acrylamide and 10 parts methyl acrylate being designated suspensor C, and the copolymer of 70 parts of acrylamide and 30 parts of methyl methacrylate being designated as suspensor D. In each run, the reactants other than the suspensor and the reaction conditions were made identical. That is to say, 76 parts of styrene was mixed with 24 parts of acrylonitrile and 0.23 part of t-dodecylmercaptane and 0.4 part of azobisisobutyronitrile were dissolved into the mixture and well blended therewith. Two hundred parts of ion-exchanged water containing dissolved therein the prescribed amount of suspensor was charged into a 5 liter capacity pressure-glass vessel in which the atmosphere therein had been replaced by nitrogen gas. 0.5 part of sodium dihydrogenphosphate was then added to adjust the pH to 6. The reaction vessel was then heated with stirring and the temperature raised to 60° C. The above monomer mixture was then charged into the reaction vessel and said vessel was sealed. Temperature inside the said vessel was raised to 70° C., which temperature was maintained for 4 hours, subsequent to which the temperature was raised to 95° C. and maintained at said temperature for 1.5 hours. The temperature of the reactor was then lowered to 70° C. and the product was recovered from the reaction vessel. The classes and amount of suspensor employed in each run are as follows:

| | Suspensor | |
|---|---|---|
| | Class | Amount, part |
| Run No.: | | |
| 1 | A | 0.05 |
| 2 | A | 0.20 |
| 3 | B | 0.05 |
| 4 | C | 0.05 |
| 5 | B | 0.20 |
| 6 | C | 0.20 |

It is noted that in Run No. 1, after approximately 3 hours, the agglomeration began to take place and the system was solidified as a whole within about 3.2 hours from the initiation of polymerization. Therefore, a continuation of this polymerization was made impossible. In connection with the remaining runs, polymers in the form of beads were obtained. After the polymerization, the polymer beads were separated by filtration and the weight of emulsion polymerized particles contained in the aqueous phase filtrate determined. The polymer beads were dried and molded into a plate of a 3 mm. thickness and the haze value was measured in accordance with the method of ASTM D 1003–61, and the results are set forth below:

| | Rate of emulsion polymerized particles (percent) | Average particle size of resulting copolymer (mesh) | Haze value of resulting copolymer |
|---|---|---|---|
| Run No.: | | | |
| 1 | (1) | (1) | (1) |
| 2 | 2.5 | 40 | 10 |
| 3 | 0 | 70 | 4 |
| 4 | 0.2 | 50 | 6.5 |
| 5 | 0.6 | 80 | 7.1 |
| 6 | 1.0 | 70 | 8.5 |

[1] Measurement was impossible because continutaion of polymerization was made impossible midway.

As will be readily evident from the foregoing, the copolymer of the instant invention provides far superior results in a suspension polymerization process as compared with those acrylic polymers outside the scope of the instant invention.

EXAMPLE 22

A polymerization was conducted under the conditions of Example 21 by employing as a monomer a mixture comprising 72 parts of methyl methacrylate, 24 parts of styrene, and 4 parts of acrylonitrile, employing the suspensor as set forth below, with the results as noted therein.

| Run No.: | Suspensor Class | Amount, part | Emulsion polymerized particles (percent) | Average particle size of resulting copolymer (mesh) | Haze value of resulting copolymer |
|---|---|---|---|---|---|
| 7 | A | 0.2 | 3 | 50 | 10.5 |
| 8 | B | 0.05 | 0 | 70 | 3.0 |
| 9 | D | 0.10 | 0.5 | 50 | 8.0 |

EXAMPLE 23

Suspension polymerization of monomers having a total weight of 1500 kg. was carried out in glass-lined polymerization vessel having a capacity of 6000 liters and capable of resisting a pressure of up to 10 kg./cm.$^2$ G. The polymerization recipe was as follows:

| | Run Number | |
|---|---|---|
| Substance | 10, part | 11, part |
| Styrene | 76 | 76 |
| Acrylonitrile | 24 | 24 |
| t-Dodecylmercaptane | 0.2 | 0.2 |
| Azobisisobutyronitrile | 0.4 | 0.4 |
| Azobiscyclohexanenitrile | 0.1 | 0.1 |
| Sodium dihydrogen phosphate | 0.1 | 0.1 |
| Suspensor | 0.03 (B) | 0.15 (A) |
| Ion-exchanged water | 180 | 180 |

The components were charged as in Example 21. The control of the polymerization temperature was effected by employing steam and water. The temperature inside the polymerization vessel was raised from 65° C. to 80° C. over a period of time of 2 hours at the same rate. Then the temperature was raised to 110° C. over a period of one hour. The system was maintained at 110° C. for 30 minutes, followed by cooling to 40° C. After the aqueous phase containing, (dispersed therein, polymer beads had been withdrawn from the bottom of the polymerization vessel, the inside thereof was observed and the matter adhering to the polymerization vessel was weighed.

Other measurements were conducted in the same manner as in Example 21. The results are shown below:

| Run Number | 10 | 11 |
|---|---|---|
| Matter adhering to polymerization vessel (kg.) | ca. 6 | ca. 52 |
| Emulsion polymerized particles (percent) | 0 | 3.2 |
| Haze value of resulting polymer | 5 | 12 |
| Average particle size of resulting polymer (mesh) | 70 | 50 |

What is claimed is:

1. In a process for effecting the suspension polymerization of vinyl monomers selected from
 (i) aromatic vinyl monomers,
 (ii) alkyl esters of acrylic and methacrylic acids,
 (iii) mixtures of (i) and (ii),
 (iv) mixtures of (i) with acrylonitrile, and
 (v) mixtures of (ii) with acrylonitrile,
in an aqueous medium having a pH of from 4 to 9, the improvement wherein said polymerization is effected employing as the suspensor at least one acrylic copolymer consisting of 70–90% by weight of acrylamide and at least one compound of the formula:

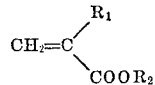

wherein $R_1$ is a member selected from the group consisting of hydrogen and methyl and $R_2$ represents an alkyl group having from 1 to 3 carbon atoms in an amount of 0.01–1.0 parts by weight per 100 parts by weight of monomer.

2. The method according to claim 1 wherein $R_1$ represents methyl and $R_2$ represents methyl.

3. The method according to claim 1 wherein $R_1$ represents hydrogen and $R_2$ represents methyl.

4. The method of claim 1 wherein the suspensor is a copolymer comprising 80% by weight of acrylamide and 20% by weight of methyl methacrylate.

References Cited

UNITED STATES PATENTS

| | | | |
|---|---|---|---|
| 2,133,257 | 10/1938 | Strain | 260—89.5 |
| 3,051,682 | 8/1962 | Ott | 260—880 |
| 3,172,878 | 3/1965 | Chromitz | 260—93.5 W |
| 3,243,419 | 3/1966 | Ingram | 260—93.5 |
| 3,350,338 | 10/1967 | Savage | 260—86.1 |

FOREIGN PATENTS

| | | | |
|---|---|---|---|
| 1,049,871 | 2/1959 | Germany | 260—935 |

OTHER REFERENCES

Schildknecht, C. E., "Vinyl and Related Polymers," Wiley and Sons, New York 1952, pp. 315–316.

JAMES A. SEIDLECK, Primary Examiner

U.S. Cl. X.R.

260—89.5 AW, 93.5 W, 885, 85.5 ES 85.5 HC